United States Patent [19]

Seybold

[11] 4,060,291
[45] Nov. 29, 1977

[54] FRICTION BEARING

[76] Inventor: Rolf Seybold, Eichenstrasse 21a, 5650 Solingen, Germany

[21] Appl. No.: 702,616

[22] Filed: July 6, 1976

[30] Foreign Application Priority Data

July 8, 1975 Germany .............................. 2530472

[51] Int. Cl.² ............................................. F16C 17/10
[52] U.S. Cl. .................................... 308/241; 308/3 R
[58] Field of Search .................... 308/3 R, 237 R, 238, 308/241

[56] References Cited

U.S. PATENT DOCUMENTS

| 3,133,477 | 5/1964 | Meijer ............................... 308/241 X |
| 3,961,104 | 6/1976 | Tanner .............................. 308/241 X |
| 3,976,342 | 8/1976 | Leyendecker et al. .......... 308/237 R |

Primary Examiner—Joseph F. Peters, Jr.
Assistant Examiner—Gene A. Church
Attorney, Agent, or Firm—Holman & Stern

[57] ABSTRACT

A friction bearing having a plurality of projecting bearing portions for supporting a component intended to move over the bearing wherein each bearing portion has a bearing surface which is variably inclined with respect to the co-acting surface of the component, the degree of such inclination of the bearing surface progressively decreasing from a maximum to a minimum in the direction of movement of the component relative to the bearing.

15 Claims, 7 Drawing Figures

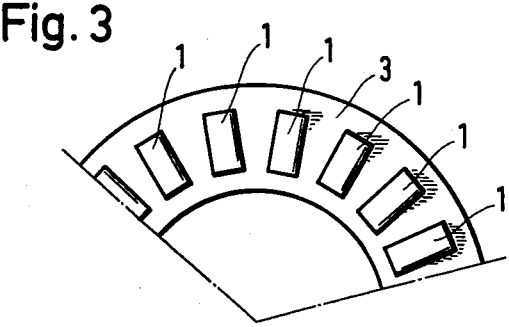
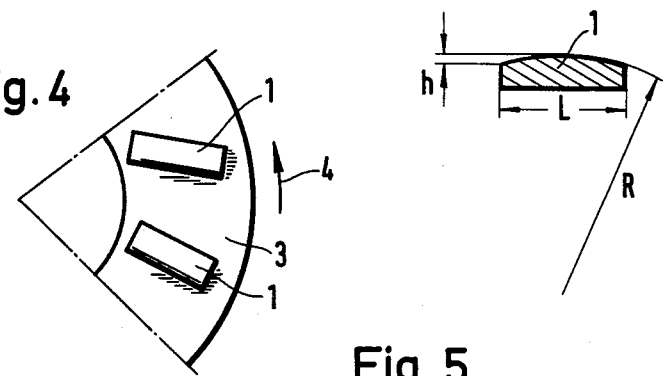
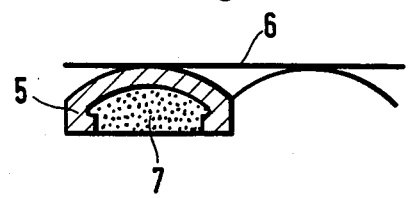
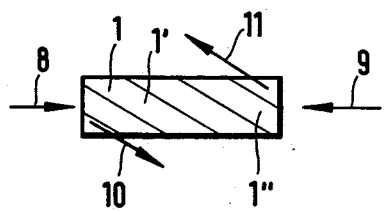
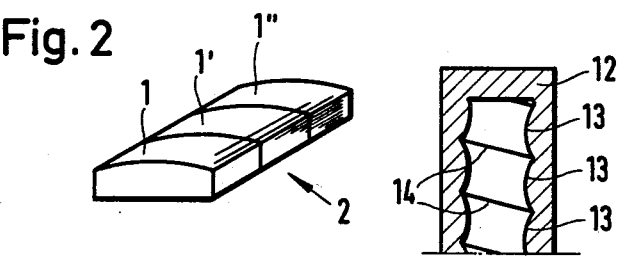

FRICTION BEARING

BACKGROUND OF THE INVENTION

The present invention relates to a friction bearing, in which there are portions which project from a base or support and which are adapted in use to engage a component supported by the bearing.

Friction bearings of this type in which bearing surfaces of said projecting portions are tapered or inclined relative to the component supported by the bearing are known in axial friction bearings. The angle of inclination of these surfaces (which are planar) in relation to the supported component is selected in such a manner that dynamic lubrication is made possible by means of a suitable lubricant. It is a known procedure to determine said angle in accordance with the size of the bearing, the running speed and the relevant lubricant viscosity. The bearing portions of the friction bearing may be designed as fixed or slightly movable units. In the case of movable units, the bearing portions adjust themselves during the movement of the supported component to a suitable angular setting in which dynamic lubrication occurs. These units can be arranged to allow the appropriate angular setting and consequently dynamic lubrication, either in one direction of movement of the component because they only allow slanting or sloping in one direction, or they allow slanting in both directions so as to cater for movement of the component relative to the bearing in either of two opposite directions. Dynamic lubrication is also known in the case of longitudinal guides in the form of pillar guides, where these not only move longitudinally in relation to each other, but are also subject to a relative rotation.

SUMMARY OF THE INVENTION

Starting from the existing state of the art, one object of the present invention is to provide an improved friction bearing which furnishes better bearing characteristics in the two opposing directions of relative movement. It is another object of the invention to provide an improved friction bearing which can be designed as an axial (thrust) bearing or as a longitudinal (journal) bearing. In the latter case the invention has as a further object the provision of a longitudinal bearing in which rotation of the supported component relative to the bearing is not essential.

According to the invention there is provided a friction bearing having a plurality of projecting bearing portions for supporting a component intended to move over said bearing characterized in that each of said bearing portions has a bearing surface which is variably inclined with respect to the adjacent surface of said component, the degree of such inclination of said bearing surface progressively decreasing from a maximum to a minimum in the direction of movement of the component over the bearing.

The angle of inclination of each bearing surface is preferably symmetrical in both of two opposite directions of movement of said component over the bearing. Furthermore it is advantageous for each bearing portion to have a curved barrel-shaped surface dropping aaway from the two sides of an apex.

According to these basic notions relating to the invention, it is possible to arrive at an effective angle of taper, determined by the relevant tangent of the curved barrel-shaped surface, dependent upon the speed and viscosity of the lubricant for each bearing component. The design range stretches from a maximum angle of inclination to an angle of 0°. In this manner, the individual bearing portions can be suited to any required speed, oil viscosity and required carrying capacity.

The barrel-shaped surface of the individual bearing portions is preferably designed with a constant radius. At its apex, the barrel-shaped surface has a tangent parallel to the adjacent surface of the supported component. Dimensions may be based on known specifications for friction bearings. For example, assuming an angle of inclination of approximately 0.3° for said apex tangent, the bearing portion may have a barrel radius of 100 mm and a length of 2.1 mm for an overall depth of barrel surface of 0.005 mm. Where a barrel radius of 1000 mm is selected, the corresponding values are 21 mm for the length and 0.05 mm for the depth. Bearing portions designed in this manner allow outstanding service results even when using extremely thin lubricanting oils. On the other hand, a greater apex tangent inclination angle, equal to 1.2°, should be used for thicker lubricating oils. The barrel radius is then 100 mm, with a length of 8.4 mm and a depth of barrel surface of 0.08 mm. In turn a barrel radius of 1000 mm, gives a length of 84 mm and a depth of 0.8 mm. The length of the bearing portion is measured in the direction of movement of said component. The surface finish may also be matched to the lubricant viscosity. In the case of thin lubricants the surface is preferably machined by turning, milling, hobbing or lapping, whereas a suitable good surface finish may be achieved by precision casting in the case of much thicker lubricants.

The individual bearing portions can be very easily parted from bar material, produced with a suitable barrel-shaped curved surface. The relatively flat angle necessary to the forming of the bearing portions for the new bearing can be produced in such a way, that firstly the portions to be machined are arranged as required for the production of circular segments. When the portions produced in this manner are presented with a suitable slope to the direction of movement of the machining tool, the effective angles can be set in the required flat plane.

The previously quoted angled position results in an elliptical profile, of small axis corresponding to the originally set diameter, and of large axis in accordance with the quotient of the small axis by the sine of the angular sloping position. The elliptical curve in the area where it is effective for bearing purposes, is consequently identified in the flat area by means of a radius, derived as the quotient of the square of half the large diameter of the ellipse by half the small diameter of the ellipse. In this manner, the effective radius ensuring the formation of the lubricant film pressure as required to form a dynamic lubricant film, is greater as the angle values are small. The effective speed components for the purpose of lubrication are equally smaller.

BRIEF DESCRIPTION OF THE DRAWINGS

The invention will now be more particularly described with reference to the accompanying drawings, wherein FIG. 1 is a section of one example of a bearing portion which can be used in a friction bearing according to the invention, FIG. 2 is an isometric view showing a bar which can be divided into separate bearing portions as seen in FIG. 1, FIG. 3 is a fragmentary plan view showing part of an axial friction bearing constructed in accordance with the invention, FIG. 4 is a fragmentary plan view showing part of an alternative design of an axial friction bearing constructed in accordance with the invention, FIG. 5 is a sectional view showing an alternative form of a bearing portion, FIG. 6 is a plan view of a longitudianl guide friction bearing in accordance with the invention, and FIG. 7 is a longitudinal section through a cylinder forming part of one example of a piston and cylinder type of longitudinal friction bearing in accordacne with the invention.

DETAILED DESCRTIPTION OF THE PREFERRED EMBODIMENT

FIG. 1 shows a section through a bearing portion 1 of which a plurality would be used in a friction bearing according to the invention. The radius of curvature of the outer or bearing surface of said portion is indicated by reference R; the depth of said curved bearing surface is shown as h and the length as L. The plan view of said portion 1(not shown in FIG. 1) is generally rectangular.

FIG. 2 shows several bearing portions 1, 1' and 1" similar to portion 1 which are cut from a single bar 2 having one surface of the aforesaid barrel-shaped curved configuration. Said bar may be produced by casting or by machining.

FIG. 3 shows, in plan view, part of an axial bearing in accordance with the invention, such bearing incorporating a plurality of said portions 1 which are mounted in a supporting ring 3 so that they are spaced apart with their center lines extending in radial directions.

FIG. 4 shows part of an alternative construction in which said individual bearing portions 1 are located in the supporting ring 3 with their center lines inclined at an angle to the radii of said ring. In this manner, the effective radius of the bearing can be considerably increased. In order to reinforce the carrying capacity in the direction of rotation of the arrow 4, the lubricant is subjected to the effects of centrifugal force.

A bearing as shown in FIG. 3 or FIG. 4 may also be produced completely as a casting, the barrel-shaped surface of individual bearing portions being subject to finish-machining in accordance with the service conditions expected and properties of the lubricant to be used.

In the case of cast bearing portions and where the bearing is to be used for direct longitudinal guiding, the bearing portions can be aligned as illustrated in FIG. 5. Thus, the individual bearing portions 5 are produced in a hollow form. In that condition, said bearing portions are pressed against a flat bearing surface 6, until the apex of each barrel-shaped surface touches said bearing surface 6. The hollow portions 5 are then filled with a pressure-resisting insert 7 more particularly in the form of a cast plastic material.

In the cast of a friction bearing intended to be used as a longitudinal guide, as shown in FIG. 6, the individual bearing portions 1, 1' and 1" may be arranged in a side by side parallel relation in which they are angled to the guiding direction 8 or 9, and in this case there is an additional advantage in that dirt and impurities are removed in the direction of arrow 10 or 11 respectively. Such a longitudinal guide system is therefore self-cleaning as well.

Finally, a friction bearing in accordance with the invention can be constructed in the form of a piston and cylinder guide. The cylinder only is shown in FIG. 7 and indicated by reference numeral 12. The barrel-shaped surfaces 13, corresponding to the barrel-shaped bearing surfaces of portions 1, are formed on the interior wall of said cylinder. Such surfaces 13 can be arranged in axially spaced sections or, as shown by the transition lines 14 in FIG. 7 they can be of generally helical (screw) configuration.

The clearance between the piston (not shown but of conventional form) and the cylinder may drop down to zero, since the pressure of the dynamic lubricating film in use can be sufficient to induce flexible distortion. The production of a cylinder or a similarly designed piston (in which case the interior of a co-acting piston will be plain) can be ensured by foundry casting methods, with or without finish-machining. In the case of cast components without finish-machining, allowances must be made in the core design, ensuring that the components can be subsequently removed.

I claim:

1. In a friction bearing having a plurality of projecting bearing portions for supporting a component intended to move over said bearing, the improvement wherein each of said bearing portions has a bearing surface which is variably inclined with respect to the adjacent surface of said component, the degree of such inclination of the bearing surface progressively decreasing from a maximum to a minimum in the direction of movement of the component over the bearing.

2. The friction bearing according to claim 1, characterized in that the bearing surface of each bearing portion is symmetrical over its length so that said inclination of said bearing surface decreases from a maximum at each end to a minimum in its center whereby the bearing portions can support said component in either of two opposite directions of movement relative to the bearing.

3. The friction bearing according to claim 2, characterized in that each bearing surface is of barrel-shaped configuration.

4. The friction bearing according to claim 3, characterized in that each barrel-shaped surface has a constant radius of curvature.

5. The friction bearing according to claim 3, characterized in that the apex of each barrel-shaped surface has a tangent which is parallel to the adjacent surface of the component supported by the bearing.

6. The friction bearing according to claim 3, characterized in that the bearing portions are formed by cutting pieces from a bar having a barrel-shaped surface.

7. The friction bearing according to claim 1, characterized in that the bearing portions are each of rectangular form in plan view.

8. The friction bearing according to claim 1, characterized in that each of said bearing portions is hollow and is filled with an insert.

9. The friction bearing according to claim 8, characterized in that each insert is made of a cast plastic material.

10. The friction bearing according to claim 1, characterized in that said bearing portions are disposed on a ring and are arranged so that their center lines extend in radial directions.

11. The friction bearing according to claim 1, characterized in that said bearing portions are disposed on a ring and are arranged so that their center lines extend in directions which are included to the radii of said ring.

12. The friction bearing according to claim 1, characterized in that the whole bearing is produced as a single casting.

13. The friction bearing according to claim 1, characterized in that the bearing portions are mounted side by side in a parallel relation so that they extend in a direction inclined to the direction of movement of the component over the bearing.

14. The friction bearing according to claim 1, characterized in that the bearing portions form part of a guide arrangement between the interior of a cylinder and the exterior of a piston.

15. The friction bearing according to claim 14, characterized in that said bearing portions are arranged on the interior of said cylinder in a helical disposition.

* * * * *